United States Patent
De Rijk et al.

(10) Patent No.: US 12,014,515 B2
(45) Date of Patent: Jun. 18, 2024

(54) ESTIMATING A POSE OF A SPATIALLY MOVABLE PLATFORM

(71) Applicant: AVULAR B.V., Eindhoven (NL)

(72) Inventors: Rogier Han Anneke De Rijk, Eindhoven (NL); Albert Maas, Eindhoven (NL); Arpit Ag-Garwal, Eindhoven (NL); Yuri Fedor Steinbuch, Eindhoven (NL)

( * ) Notice: Subject to any disclaimer, the term of this patent is extended or adjusted under 35 U.S.C. 154(b) by 823 days.

(21) Appl. No.: 17/056,701

(22) PCT Filed: May 17, 2019

(86) PCT No.: PCT/NL2019/050289
§ 371 (c)(1),
(2) Date: Nov. 18, 2020

(87) PCT Pub. No.: WO2019/226045
PCT Pub. Date: Nov. 28, 2019

(65) Prior Publication Data
US 2021/0209791 A1    Jul. 8, 2021

(51) Int. Cl.
*G06T 7/73* (2017.01)
*B64C 39/02* (2023.01)
*B64U 101/30* (2023.01)

(52) U.S. Cl.
CPC .............. *G06T 7/73* (2017.01); *B64C 39/024* (2013.01); *B64U 2101/30* (2023.01); *G06T 2207/30204* (2013.01); *G06T 2207/30252* (2013.01)

(58) Field of Classification Search
CPC .................................. B64U 70/95; G06T 7/73
See application file for complete search history.

(56) References Cited

U.S. PATENT DOCUMENTS 6,324,296 B1 *  11/2001  McSheery .................. G06T 7/70
                                                          250/559.32
7,023,536 B2 *  4/2006   Zhang .................. G01B 11/002
                                                              356/138
(Continued)

FOREIGN PATENT DOCUMENTS

CN        108496057 A  *  9/2018  ........... G01C 21/206
EP         3037837 A1  *  6/2016  ............... G01S 5/16
(Continued)

*Primary Examiner* — Christopher P Ellis
(74) *Attorney, Agent, or Firm* — RC Trademark Company (57) ABSTRACT

Method of estimating a pose of a spatially movable platform, comprising providing at least one beacon, each beacon transmitting a mutually different blinking pattern relating to said beacon by modulating an intensity of an optical radiation signal, providing a pose estimation system comprising an image capturing device mounted on a spatially movable platform and image processing means communicatively connected to said image capturing device, capturing and processing a sequence of two-dimensional images comprising identifying at least one image object, determining an intensity variation of said at least one image object, detecting said blinking pattern relating to one of said at least one beacon, and matching said image object to a corresponding beacon using said detected blinking pattern, estimating a pose of said spatially movable platform relative to said at least one beacon using said at least one matched image object, wherein said modulating said intensity of said optical radiation signal of said beacon is performed using at least two different non-zero radiation states, and wherein said intensity variation of said at least one image object in said sequence of two dimensional images is between at least two different non-zero intensity states.

16 Claims, 3 Drawing Sheets

(56) References Cited

U.S. PATENT DOCUMENTS

| | | | | |
|---|---|---|---|---|
| 7,161,664 | B2* | 1/2007 | Buermann | G01S 17/87 |
| | | | | 356/3.1 |
| 7,739,034 | B2* | 6/2010 | Farwell | G05D 1/0244 |
| | | | | 701/445 |
| 10,007,825 | B2* | 6/2018 | Wang | G06K 7/1447 |
| 10,057,727 | B2* | 8/2018 | Maricic | H04W 4/029 |
| 11,346,653 | B2* | 5/2022 | Van Weeren | G01B 11/16 |
| 11,442,463 | B1* | 9/2022 | Fotland | G06V 20/10 |
| 2007/0150097 | A1* | 6/2007 | Chae | G05D 1/0234 |
| | | | | 700/245 |
| 2007/0211239 | A1* | 9/2007 | Mandella | G06T 7/73 |
| | | | | 356/138 |
| 2008/0204699 | A1* | 8/2008 | Benz | G01S 17/875 |
| | | | | 356/614 |
| 2010/0001998 | A1* | 1/2010 | Mandella | G01B 11/002 |
| | | | | 345/173 |
| 2010/0013860 | A1* | 1/2010 | Mandella | G06F 3/04815 |
| | | | | 345/157 |
| 2014/0198206 | A1* | 7/2014 | Murray | G01S 5/16 |
| | | | | 348/135 |
| 2019/0265722 | A1* | 8/2019 | Haeusler | G05D 1/0251 |

FOREIGN PATENT DOCUMENTS

| | | | | |
|---|---|---|---|---|
| WO | WO-2017125338 A1 * | 7/2017 | | G01C 21/206 |
| WO | WO-2018002679 A1 * | 1/2018 | | G01S 1/7038 |

* cited by examiner

ESTIMATING A POSE OF A SPATIALLY MOVABLE PLATFORM

FIELD OF THE INVENTION

The invention relates to a method for estimating a pose estimation of a spatially platform, comprising:
providing at least one beacon comprising an optical transmitter;
each beacon transmitting an optical radiation signal using said optical transmitter,
each beacon transmitting a mutually different blinking pattern relating to said beacon by modulating an intensity of said optical radiation signal;
providing a spatially movable platform;
providing a pose estimation system comprising an image capturing device mounted on said spatially movable platform and image processing means communicatively connected to said image capturing device;
capturing a sequence of two-dimensional images of said optical radiation signal from said at least one beacon by said image capturing device; and
processing said sequence of two-dimensional images by said image processing means,
The invention further relates to a beacon for pose estimation, a pose estimation system, and a robotic platform having a pose estimation device.

BACKGROUND

Pose estimation is nowadays often established using visual sensors. Pose estimation can be defined as an estimation of a three-dimensional position and orientation. Machine vision based pose estimation has the advantage that the sensor is small, lightweight, low power and widely available. This facilitates essential features such as odometry, mapping, place and object recognition and collision detection, which all can be applied to some extent in the development of safer and more robust mobile robotic applications.

Most machine vision based pose estimation methods make use of the so-called Perspective-n-Point algorithm, abbreviated as PnP-algorithm, which estimates the camera pose from a set of 3D-to-2D point correspondences. Here 3D, short for three-dimensional, refers to the actual point position of visual markers in the world fixed frame and 2D, short for two-dimensional, refers to the coordinates of image object in the camera plane, which correspond to the visual markers. Many different PnP-solvers can be found in literature, with all its relative pros and cons. For a correct pose estimation the 3D-points in the real world have to match a 2D-image object, i.e. a center image point of an image object in the camera plane must correspond to its source, i.e. point on the beacon in the real world, which is known as the so-called matching problem.

Monocular vision-based pose estimation systems are known in the art, wherein for example passive markers and LEDs are used in the visible or infrared spectrum on a fixed marker in order to perform pose estimation using a camera mounted on a moving platform such as a quadcopter. Artificial patterns may be used in combination with a spatially movable platform having a camera mounted thereon as a cheap method for obtaining the pose estimates. The term spatially is to be construed as three-dimensionally. In addition to pose estimation these patterns provide an identity of the tag, which makes them more versatile, since multiple tags can be placed into a larger space in order to navigate in larger environments. A drawback of these methods is that they are passive and therefore sensitive to changing ambient light conditions.

In another example, markers may be mounted on the spatially movable platform such as a drone and the camera is mounted in the environment. Such an example may only provide close range pose estimation, or may require multiple cameras for tracking the spatially movable platform.

A similar approach can be found in systems employing a small number of active or passive circular markers having artificial patterns. The previously discussed matching problem can be performed based on the geometry of the artificial pattern. Such matching however may be sensitive to changing light conditions, occlusion, and optical distortion due to the distance from marker to optical sensor and the viewing angle.

Active optical markers in beacons using a single optical radiation source in the art, as shown in US patent application no 2014/0198206 A1, may transmit a blinking pattern which can be used to match the beacon with the image object obtained by the optical sensor or camera on the spatially movable platform. The transmission of the blinking pattern involves switching an optical transmitter in the beacon to an on and off transmission state, such that an intermittent optical radiation signal is generated by the optical transmitter in accordance with the blinking pattern. Such an intermittent transmission however may interfere with the optical sampling rate of the optical sensor, which may cause faulty identification. Moreover, a number of subsequent zero's transmitted by the optical transmitter may be misinterpreted as occlusion.

SUMMARY

It is therefore an object of the invention to provide pose estimation for a spatially movable platform which is robust for occlusion and changing light conditions, and frame rate interference.

The object is achieved in a method of estimating a pose for a spatially movable platform The method comprises providing at least one beacon comprising an optical transmitter, each beacon transmitting an optical radiation signal using said optical transmitter. Each beacon transmitting an optical radiation signal comprises transmitting a mutually different blinking pattern relating to said at least one beacon by modulating an intensity of said optical radiation signal.

The method further comprises providing a spatially movable platform and providing a pose estimation system comprising an image capturing device mounted on said spatially movable platform and image processing means communicatively connected to said image capturing device.

The method further comprises, capturing a sequence of two-dimensional images of said optical radiation signal from said at least one beacon by said image capturing device, and processing said sequence of two-dimensional images by said image processing means. The processing of said sequence of two-dimensional images by said image processing means comprises identifying at least one image object in said sequence of two-dimensional images, determining an intensity variation of said at least one image object, detecting said blinking pattern relating to one of said at least one beacon using said intensity variation, and matching said image object to a corresponding beacon using said detected blinking pattern to obtain a at least one matched image object, and estimating a pose of said spatially movable platform relative to said at least one beacon using said at least one matched image object.

Said modulating said intensity of said optical radiation signal of said beacon is performed using at least two different non-zero radiation states, and said intensity variation of said at least one image object in said sequence of two dimensional images is between at least two different non-zero intensity states.

The non-zero intensity states allow an image object corresponding to a beacon to be continuously present in the sequence of captured images for performing the pose estimation, contrary to beacons that send their blinking pattern using zero and non-zero light intensities as captured by the image capturing device by which image objects corresponding to beacons can be identified. Whenever in the method the image object corresponding to the beacon is not available, it can be assumed that occlusion has occurred, and adequate corrective action can be taken. Matching of beacons to image object in the sequence of captured images is thereby more reliable.

In an embodiment, said at least two different non-zero radiation intensity states comprise a high intensity state and a low intensity state. This allows for more than two distinct values to be transmitted per code element. It is thereby possible to send more compact blinking patterns per beacon.

In an embodiment, said blinking pattern comprises a code having a plurality of code elements, and wherein each code element has a value. This is a more common way of transmitting the blinking pattern. The code can have multi value code elements, i.e. each code element may have two or more discrete values, or have a value in a range of values.

In an embodiment, said plurality of code elements comprises bits, each bit having a true value or a false value. This way the code is a binary code.

In an embodiment, said code has a fixed number of code elements. In other words the code has a fixed length. Thus it is known when a sufficient number of code elements have been received to detect the code.

In an embodiment, said code comprises a first number of bits having a true value and a second number of bits having a false value, wherein said first and second number are equal. This allows an average intensity value of said optical signal to be maintained between a high intensity and a low intensity.

In an embodiment, said code comprises a cyclic code. This allows code delay-less detection of the blinking pattern. As soon as a predetermined number of code elements have been identified, the blinking pattern can be detected. Subsequently, the image object for which the blinking pattern was detected can be matched to a beacon.

In an embodiment, said code for each of said at least one beacon has a Hamming distance relative to codes of other beacons comprised in said plurality of beacons. This allows adequate distinction between said mutually different codes, and allows for error correction of detected blinking patterns. If an error occurs, the correction using the Hamming code may make renewed detection superfluous.

In an embodiment, said detecting of a blinking pattern relating to a beacon from said at least one image object further comprises converting each image of said sequence of two-dimensional images into a binary image, and representing said image object as a binary large object (BLOB). This allows simple and fast processing of the image object in the sequence of captured images.

In an embodiment, said determining said intensity variation of said image object, comprises determining a size of said image object. An image object relating to a beacon may exhibit a size in the sequence of captured images proportional to the detected optical intensity of the optical radiation from the related beacon. Thus by establishing a variation in time of the size of image object, code elements of the blinking pattern relating to the corresponding beacon can be retrieved.

In an embodiment, determining said intensity variation of said image object further comprises tracking said image object in said sequence of two-dimensional images. This allows the blinking pattern of the image object relating to a corresponding beacon to be established when the image object moves in time and appears with different coordinates in the sequence of captured images. Moreover, once the blinking pattern is established and the image object is matched to a beacon, the tracking allows the position of said image object in said sequence of captured images to be available for the pose estimation.

In an embodiment, said tracking comprises pixel distance matching between corresponding image object in consecutive images of said sequence of captured images. By determining a pixel distance between uniform or similar image objects in consecutive images of said sequence of captured images, the image object locations may be tracked in said sequence of captured images.

In an embodiment, said tracking comprises determining a spatial displacement of said spatially movable platform using displacement determining means, and predicting a displacement of image object in consecutive images of said sequence of captured images using said displacement of said spatially movable platform. The spatial displacement of the movable platform can be determined with alternative sensors, such as an inertia measurement unit (IMU). From such spatial displacement the displacement of image object relating to beacons in consecutive images of the sequence of captured images can be predicted using a coordinate transformation of the real world spatial location of the movable platform to image sensor coordinates.

In an embodiment, said tracking comprises determining an optical flow between consecutive images of said sequence of captured images, and predicting a corresponding displacement of corresponding objects in consecutive images of said sequence of captured images using said optical flow. Optical flow can be defined as a pattern of apparent motion of objects, surfaces, and edges in a visual scene caused by the relative motion between an observer and a scene. So when motion of the movable platform is established using the step of pose estimation, the relative position of beacons and their corresponding image object in the sequence of captured images can be predicted using the optical flow using coordinate transformation.

In an embodiment, said tracking comprises determining a direct correlation between consecutive images of said sequence of captured images, and predicting a corresponding displacement of corresponding objects in consecutive images of said sequence of captured images using said direct correlation.

In an embodiment, said tracking comprises determining a direct correlation between a selection of image object in consecutive images of said sequence of captured images, and predicting a corresponding displacement of other image object in said consecutive images of said sequence of captured images using said direct correlation. This allows efficient tracking of a larger number of image objects, wherein the tracking of said larger number of objects is based on the correlation of only a limited number of image objects in the selection.

In an embodiment, said tracking is performed every m-th subsequent image of said sequence of captured images, wherein m is an integer value greater than 1. By skipping the tracking over a number of consecutive images in the sequence of captured image, processing time involved in the tracking can be reduced.

In an embodiment, said pose estimation is based on a perspective-n-point (PnP) method. This allows pose estimation on two-dimensional images from a single image sensor.

In an embodiment, said providing said pose estimation system comprises at least one further image capturing device, said at least one further image capturing device being arranged for capturing at least one further sequence of two-dimensional images of said optical radiation signal from said at least one beacon by said image capturing device, and wherein said processing said sequence of two-dimensional images by said image processing means comprises processing said at least one further sequence of two-dimensional images to create a three-dimensional map of the beacons, and wherein said estimating a pose is based on said three-dimensional map. This allows stereoscopic processing of the sequences of two-dimensional images. This provides an alternative way of pose estimation relative to PnP pose estimation.

In an embodiment, the method further comprises measuring at least one distance from said spatially movable platform to each of said at least one beacon, and wherein said processing said sequence of two-dimensional images by said image processing means comprises creating a three-dimensional map of the beacons using said sequence of two-dimensional images and said at least one distance from said spatially movable platform to each of said at least one beacon, and wherein said estimating said pose is based on said three-dimensional map.

Resection in combination with distance measuring provides an alternative method for creating a three-dimensional map of the beacons for estimating a pose using PnP algorithms. It can be advantageously used in combination with other methods for determining depth such as stereovision.

The object is also achieved according to another aspect of the invention in a beacon for use in the method for estimating of a pose of a spatially movable platform.

The beacon comprises an optical transmitter for transmitting an optical radiation signal, a modulator configured and arranged for modulating said optical transmitter in accordance with a blinking pattern relating to said beacon, said blinking pattern comprising a plurality of code elements, wherein said modulator is further configured and arranged for intermittently transmitting said optical radiation signal using at least two different radiation intensity states corresponding to respective code element values of said blinking pattern. The beacon is characterized by said at least two different radiation intensity states corresponding to said respective code element values of said blinking pattern comprise at least two different non-zero radiation states.

The object is also achieved according to another aspect of the invention in a pose estimation system for use in the method for estimating of a pose of a spatially movable platform. The pose estimation system comprises an image capturing device and image processing means, wherein said image processing means are communicatively connected to said image capturing device. Said image capturing device is configured and arranged for capturing a sequence of two-dimensional images of said optical radiation signal from at least one beacon, said beacon being configured and arranged as described above, for intermittently transmitting said optical radiation signal using at least two different radiation intensity states corresponding to respective code element values of said blinking pattern, wherein said least two different radiation intensity states corresponding to said respective code element values of said blinking pattern comprise non-zero radiation states. The system is characterized by that said image processing means for processing said sequence of two-dimensional images, are configured and arranged for identifying at least one image object in said sequence of two-dimensional images, determining an intensity variation of said at least one image object, detecting said blinking pattern relating to said beacon using said intensity variation, and matching said at least one image object to a corresponding beacon using said detected blinking pattern to obtain at least one matched image object, and estimating a pose of said spatially movable platform relative to said at least one beacon using said at least one matched image object.

Said intensity variation of said at least one image object in said sequence of two dimensional images is between at least two different non-zero intensity states.

The object is also achieved according to another aspect of the invention in a spatially movable platform for use in the method for estimating of a pose of a spatially movable platform. The spatially movable platform is associated with a pose estimation system as described above. Said spatially movable platform is provided with an image capturing device of said pose estimation system.

In an embodiment, said spatially movable platform is associated with at least one of an airborne vehicle, a mobile vehicle, a ground based system having a movable portion, and wherein said spatially movable platform has a body and means for spatially positioning said body.

BRIEF DESCRIPTION OF THE DRAWINGS

The invention will be further elucidated on the basis of illustrative drawings set out below.

DETAILED DESCRIPTION OF EMBODIMENTS

Figure 1:
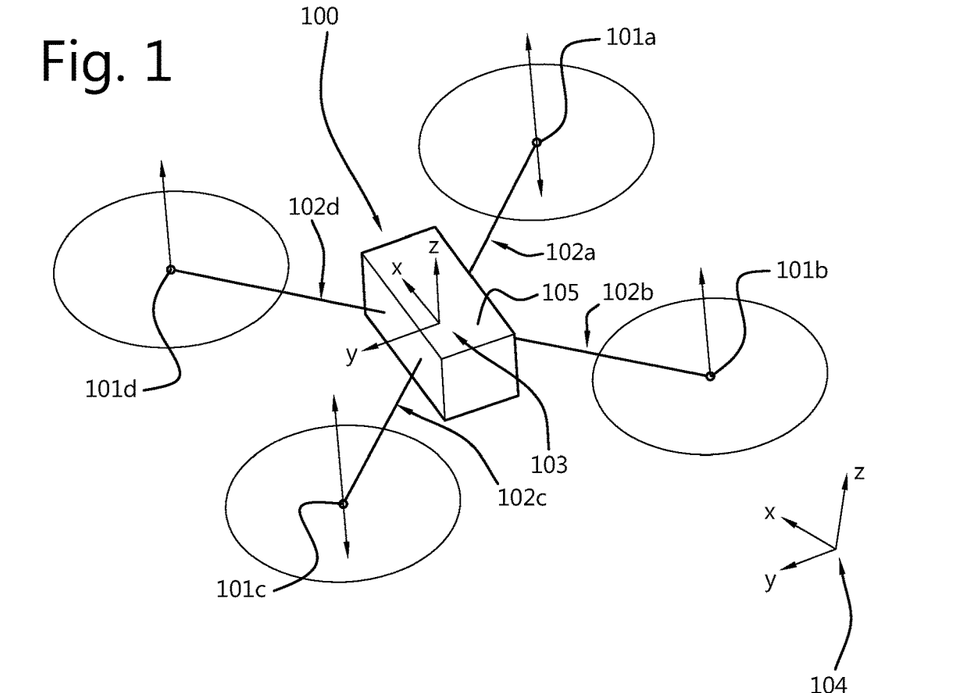
FIG. 1 shows a schematic representation of a movable platform according to an embodiment of the invention.

In FIG. 1 an example of a spatially movable platform 100 is shown. In this example, the spatially movable platform 100 is represented by a quadcopter. The spatially movable platform 100 of FIG. 1 has a rotating and translating body 105 with four actuators 101*a*-101*d* connected to the body 105 via beams 102*a*-102*d* as spatial positioning assembly. The actuators 101*a*-101*d* can be motors with associated propellers for generating lift, and controlling position and orientation for the spatially movable platform 100. Each actuator 101*a*-101*d* provides a lift force in a body-fixed z-direction and a torque in a horizontal plane to the quadcopter body 105. The position and attitude of the quadcopter, i.e. pose, can be controlled by varying lift force and torque of the individual actuators 101*a*-101*d*.

Two coordinate systems are considered, a world fixed frame 104 having coordinates relative to the real world and a body fixed frame 103 having coordinates relative to the body 105 of the movable platform 100, as depicted in FIG. 1.

The pose of the movable platform 100 can be described by a position vector p=[x, y, z] and spatial orientation, also referred to as attitude, which spatial orientation can be parametrized by an angular vector λ, with respect to a world fixed frame coordinate system 104, wherein the angular vector λ=[ϕ, θ, ψ] represents pitch, roll and yaw angle, respectively. Pose estimation for movable platforms, in particular for quadcopters, is typically performed using a combination of multiple sensors. In the art Inertial Measurement Unit (IMU) may be used to acquire position and orientation. An IMU typically consists of a three-axis accelerometer, a three-axis gyroscope and a three-axis magnetometer. The accelerometer measures the body-fixed accelerations, the gyroscope measures the angular velocities and the magnetometer measures the ambient magnetic fields in its body-fixed frame. Acquiring accurate orientation estimates is typically more crucial than position estimates as they are primary variables used in the stabilization control of the movable platform 100 in the air. In the present application monocular machine vision is presented in combination with optical beacons as markers to estimate pose, i.e. position and orientation.

A quadcopter is an example of an airborne spatially movable platform. It can be utilized as an airborne vehicle. Airborne vehicles such as airplanes, helicopters, UAV's or drones etc. may be interpreted as spatially movable platforms in which pose estimation can be utilized. They can be three-dimensionally positioned using actuators for generating lift and/or speed and orientation. Another example of movable platform is a mobile vehicle, which may comprise a mobile portion and a spatially movable portion which is movable relative to the mobile portion. The movable portion may be connected with a three dimensional positioning system on the mobile portion. The pose estimation as described in this application may be used to position and orient the movable portion relative to the mobile portion and/or relative to the environment, i.e. real world in which the mobile portion operates. This also applies to ground based systems which may comprise a base connected to earth and a movable portion connected to the base with a three-dimensional positioning system. An example of such a three-dimensional may be a robotic arm. Another example is a ground based machine having a three-dimensionally movable portal with a tool head, which may require pose estimation to position and orient a tool in the tool head. An example of such a machine is a milling machine.

Figure 2:
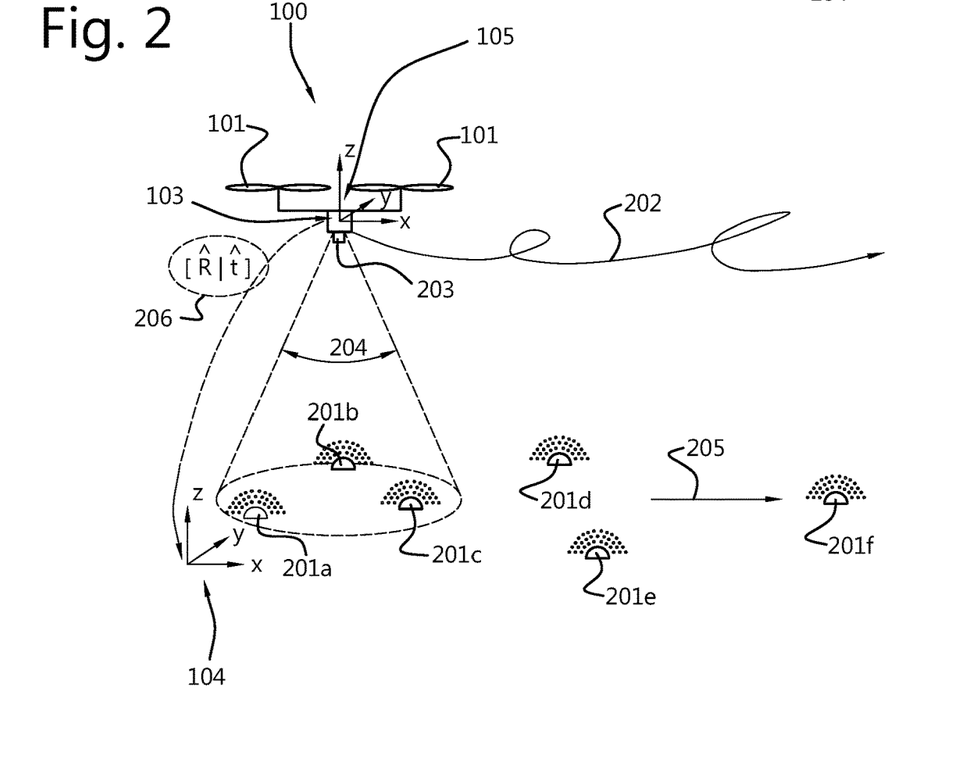
FIG. 2 shows a schematic overview of a pose estimation system according to an embodiment of the invention.

FIG. 2 gives a schematic overview of the idea behind the proposed pose estimation system. A certain number of beacons, with their locations denoted by 201a-201f are deployed in an environment at known locations, where nB is the total number of beacons. A down-facing camera 203 is mounted rigidly to movable platform 100. In this example the movable platform is a quadcopter. The movable platform has an illustrative spatial path 202. When the camera 203 has three or more beacons 201a-201c in its field of view 204, and these beacons are correctly identified, then the system is able to estimate its pose, denoted by [^R|^t], where ^R represents estimated attitude states, represented by a rotation matrix, and ^t denotes translation states. The pose represents the location and orientation of the movable platform's body frame 103 with respect to the world fixed frame 104.

Since a movable platform may be quite dynamic an omnidirectional lens may be used such that the obtained images captures as much information as possible. Many robotic systems rely on machine vision systems equipped with omnidirectional lenses, since omnidirectional lenses enable to include all information of the sensor's surroundings in one image. One single omnidirectional camera can be sufficient to see 360 degrees around the camera, without the need for moving parts. An omni-directional lens can refer to an omnidirectional mirror placed in front of the image sensor or to a wide-angle fisheye lens. In the proposed positioning system the movable platform moves around and the beacons are placed on the ground at known locations. By installing a wide angle lens, the chance of capturing more beacons is higher, which improves the accuracy of the pose estimation. Therefore, it is desirable to have the field of view (FOV) 204 to be as large as possible.

The lens can for example be chosen to be a fisheye lens with a 220 degrees FOV. The image circle of this lens can match the smallest dimension of the image sensor, which is desired because the entire image circle, capturing 220 degrees, is projected onto the image sensor, in that case.

Figure 3A:
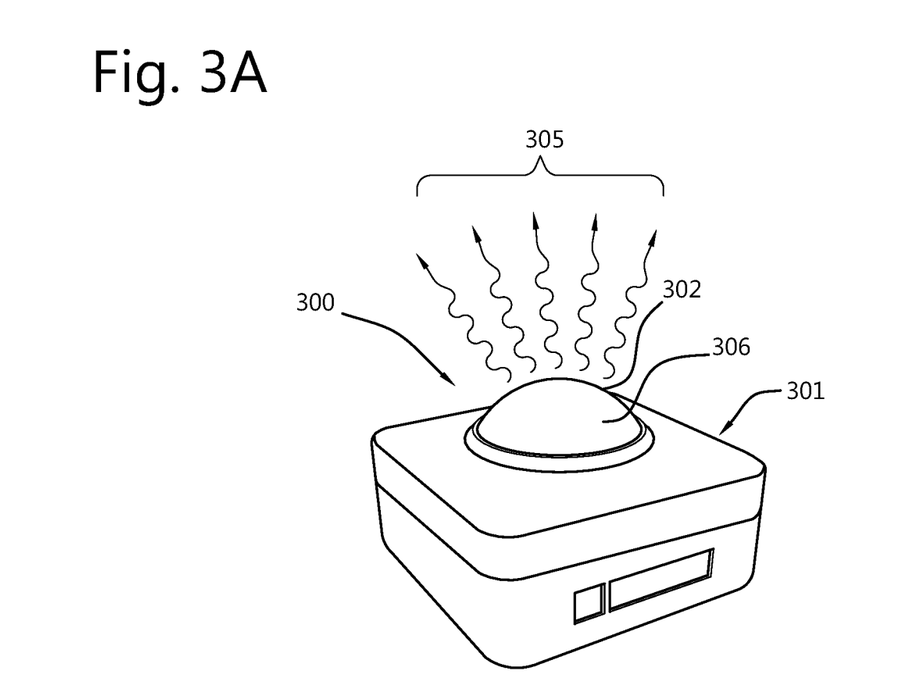
FIG. 3A shows a beacon according to an embodiment of the invention.

FIG. 3A shows an example of a beacon 300. The beacon has a housing 301 and an optical transmitter 302. The optical transmitter 302 is arranged to emit optical radiation, more specifically an optical radiation signal 305. The optical radiation signal 305 may be in the visual light spectrum. Preferably the optical radiation is in an infrared spectrum. This allows for easy filtering out of objects and light sources in the image sensor or camera 203 which are not required for the pose estimation. The imaging device of the movable platform is then provided with a spectral filter with a spectral pass band compatible with the wavelength of the optical radiation signal of the beacon 300.

Figure 3B:
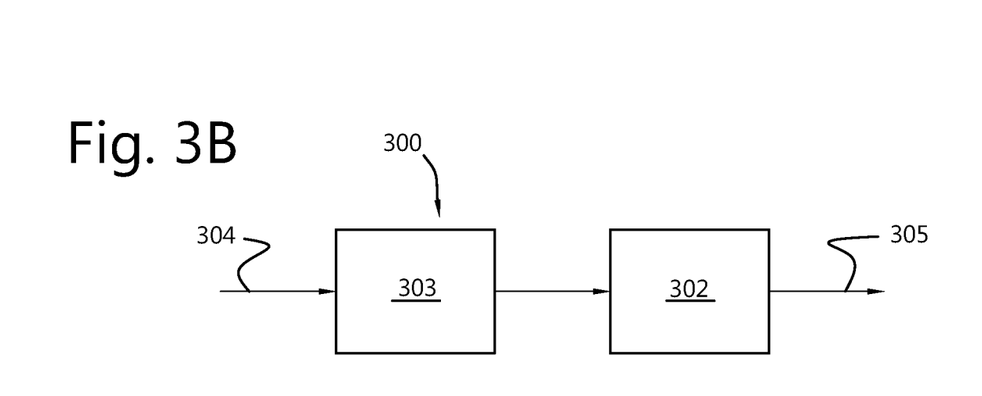
FIG. 3B shows a functional block diagram of the beacon of FIG. 3A.

In the functional block diagram of FIG. 3B it is shown that a beacon 300 may comprise a modulator 303, which is arranged to modulate the optical transmitter 302 in accordance with a blinking pattern 304, causing the optical transmitter to transmit the optical radiation signal 305 having a radiation intensity variation corresponding to the blinking pattern 304. The modulator can be a microprocessor or microcontroller having a PWM output connected to the optical transmitter, which processor or controller is programmed to generate a predetermined blinking pattern 304. The blinking pattern 304 is unique for every beacon 300 and can be used to identify the beacon 300. The radiation intensity varies between a high and a low radiation intensity state for the transmission of binary blinking patterns. The radiation intensity may also vary between multiple intensity states or levels, e.g. three or more intensity states, to allow a blinking pattern 304 having a higher information density relative to binary blinking patterns.

The optical transmitter 302 can be based on high power LED's, which are arranged for emitting optical radiation 305 in a spectral range as required.

The main mechanical part of the beacon 300 is the housing 301, which in an example consists of two custom designed 3D-printed plastic parts, which can be screwed together by four small bolts. Plastic 3D-printing provides a versatile, easy and cost-efficient production method for small quantity products, making it an ideal production method for prototypes, such as these beacons. The housing can for example be 3D-printed with PA-material and may be color-dyed in black. The PA-material can be selected because of its favourable mechanical properties in combination with its relatively low-cost. A heatsink can be used to dissipate the heat produced by the LEDs constituting the optical transmitter 302. Natural convection cooling channels may be incorporated in the housing 301 in order to provide sufficient cooling. Additionally, the identities corresponding to the blinking patterns of the beacons may be indicated with a number on an identity plate attached to the housing 301. The beacon 300 may be provided with the battery level indicator LED and the charging indicator LED.

On top of the beacon 300 a large diffuser lens 306 can be mounted which diffuses the emitted optical radiation of the LEDs to all directions, creating a beam angle of the transmitted optical signal 305 which may exceed 180 degrees. This large diffuser lens 306 creates a larger image object, i.e. blob in the camera image compared to the situation without the diffuser lens, which is beneficial for the detectability over large distances.

Figure 4:
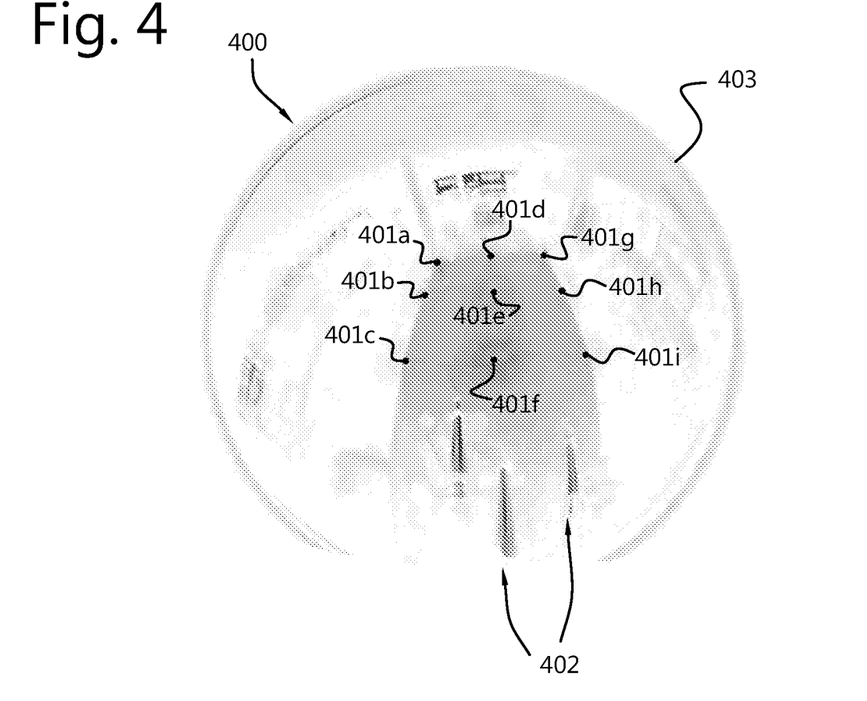
FIG. 4 shows an example of an image having image objects corresponding to beacons according to an embodiment of the invention.

In FIG. 4 an example is shown of an image 400 as captured by the image capturing device, i.e. camera system 203. The image 400 can be transformed into a binary image, by comparing individual pixels of the image with a threshold. Thus, in a background 403 contrasting image objects 401a-401i corresponding to beacons are shown with corresponding identification numbers which have been added by the camera system processing software to the image 400 for user convenience. The identification numbers were established after matching the image objects 401a-401i with beacon identification numbers.

Some image objects 402 may show up which may not correspond to beacons. Image objects 401a-401i corresponding to beacons may be identified by detecting the blinking pattern as described above. Other objects 402 do not exhibit a blinking pattern and will therefore not be identified as beacons.

As each beacon emits a unique fixed-length blinking pattern, where the beacon switches between a high intensity state and a low intensity state. The camera system is able to retrieve the identity of a beacon by tracking the image object intensity, i.e. luminance over time in consecutive images from the camera system 203. The appearance of image objects corresponding to the beacons can be enhanced relative to other objects using optical radiation in the infrared spectrum, and applying an infrared bandpass filter for the camera system.

Figure 5:
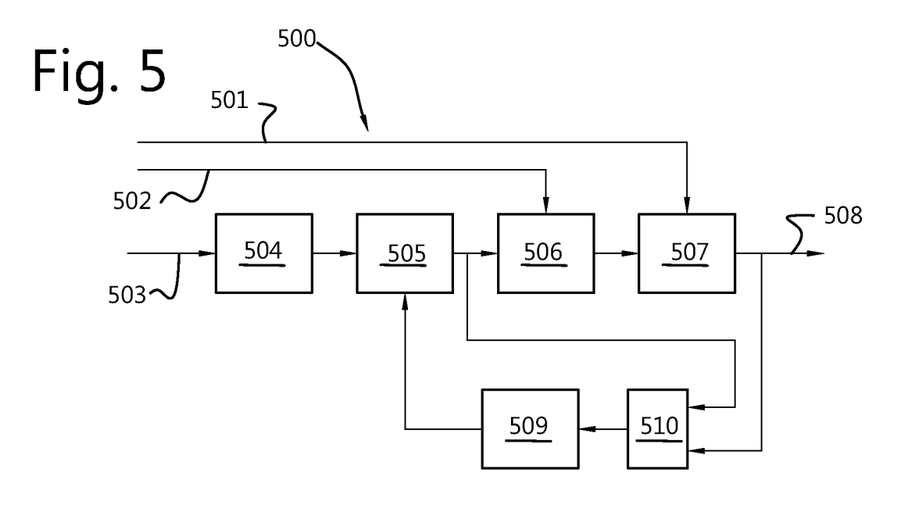
FIG. 5 shows a flow diagram of a process for estimating a pose according to an embodiment of the invention.

FIG. 5 depicts globally a flowchart of the pose estimation method 500, indicating individual processes performed by the method. A current camera image 503, camera parameters 502 and the 3D positions 501 of the beacons serve as inputs to the method. In the figure, 510 denotes a time delay. The output 508 of the method is the estimated 6 degrees-of-freedom (DOF) pose. The next sections discuss the individual processes in detail.

In step 504, image objects are detected. Image objects can be detected by representing them as binary large objects (blob). Blob refers to a group of connected pixels in a binary image. Before a blob can be matched to a beacon it first has to be detected in the image. Since numerous computer vision related systems rely on blob information, many methods can be found in the literature and a large number of software packages are available that include algorithms for blob detection. The infrared beacons appear as very bright blobs in the relatively dark image. Thus, a simple threshold function can be used to distinguish the blobs from the background.

In practice other artefacts in the environment, e.g. indoor light sources or the sun shining through a window, can appear as bright areas in the image, which are classified as blobs if they pass the threshold. These artefacts are undesired as they can compromise the result of the identification process. These artefacts are to be distinguished from the image objects relating or corresponding to beacons, in order to limit the occurrence of faulty detections. Since a blob consists of multiple pixels certain properties of a blob can be extracted by off-the-shelf functions in computer vision programs, such as for example OpenCV of the MATLAB Vision toolbox.

The area, convexity and inertia ratio are the most interesting properties to evaluate, since these properties can be used to exclude blobs caused by environmental phenomena, which are undesired, from the total set of detected blobs. To limit the occurrence of faulty detections due to the presence of environmental features, several restrictions on the geometry of the blobs are proposed. This is valid since the beacons have a distinct appearance in the image. Therefore, blobs with a different appearance can be filtered out. The area of a blob is an important criteria in the proposed identification method. But before the blob areas are used in the identification method, some restrictions are set on the areas of the blobs. First, blobs that have a small area (only a few pixels) carry not enough information to safely identify a blob. Furthermore, if a blob is very large then the camera is very close to a beacon, which probably does not happen in practice, or the blob is caused by an undesired environmental feature. Therefore, it is wise to set a minimum and a maximum threshold for the blob areas.

Convexity is defined as the ratio between the area of the blob and the hull area. The hull area is the area of the tightest convex shape that completely encloses the shape, i.e. the convex polygon surrounding all the points of the contour with minimum area. A convexity of 1 implies that the contour is smooth with no indents. The beacons will always appear as convex blobs, so all concave blobs can be filtered out.

Inertia ratio is the ratio between the length of the minor axis and major axis of a blob. The major axis is defined as the axis between two points on the blob that are the most distant from each other. The minor axis is the line that passes through the blob center and that is perpendicular to the major axis. The inertia ratio contains information about the elongation of a blob, e.g. a circle's inertia ratio is 1 and a line's inertia ratio is close to 0. The beacons will appear as a full circle, viewed from above, or as half circle when viewed from the side, or some shape in between, as a result of the shape of the diffuser lens of the beacons. Therefore all blobs with an inertia ratio smaller than 0.5 may for example be filtered out, since half circles have a convexity of 0.5.

In step 505 image objects, blobs corresponding to beacons, are identified. Next to the calculation of the blob properties mentioned before also centroids, i.e. the centers of masses, of the blobs are calculated with sub-pixel accuracy. This is necessary because these centers are the image points of which the coordinates are fed into the PnP algorithm. Since the algorithms that calculate these properties are widely known in the art, their principles are not discussed here. Since the identity of a blob can not be derived from a single image (without additional information such as geometry of the beacon placement or previous pixel location), as they appear all the same, a method is developed in order to find out the relation between the image objects 401a-401i i.e. blob detections, in the image 400 and the beacons in the world, for example beacons 201a-201f in FIG. 2, based on information from previous images.

As described, each beacon 201a-201f repeats a certain predefined fixed-length blinking sequence, which can be used to find the identity of a certain blob in the camera image. The blinking rate can be matched to the frame rate of the camera system, so that each camera frame captures a single element of the blinking sequence. The length of the blinking sequence is dependent of the number of beacons used. The more beacons deployed, the longer the blinking sequence, since more code elements are needed to define a unique binary blinking sequences for each beacon.

The blinking sequences can be represented by a binary vector corresponding to the time period of the blinking sequence. The beacons switch between a high intensity and a low intensity, less than the high intensity, to respectively transmit a 1 or a 0 of the binary vector. An example of the low intensity is half of the high intensity. The difference between the high intensity state and the low intensity state is noticeable in the image by the detected area of the blob. The half intensity state is chosen, because in practice it is experienced that the difference in blob area between high intensity and half intensity is large enough to successfully extract the blinking sequences, even over large distances. However other low intensities may be chosen, for example 70 or 80% of the high intensity may also achieve adequate transmission of the binary vector in the blinking sequence. An example of a binary vector in a blinking sequence of beacon 201a is:

C1=[0 0 0 1 0 0 1 1 0 1 1 1].

Since the geometry of the blobs can change in consecutive images 503 during operation due to the varying distance between the camera system 203 and for example beacons 201a-201f, an adaptive threshold method can be used to identify the 0's and 1's of the blinking sequence. As described, multilevel codes, codes having more than two intensity levels may be employed to transfer denser identification codes in the blinking sequences.

Now that the blinking sequence can be obtained it is checked if the obtained sequence corresponds to one of the predefined binary codes of the beacons, for example C1. Note that, the sequence may correspond to the same binary code but shifted one or more steps further in discrete time. In order to be able to successfully match a blob to a corresponding beacon at any time blob identification should cope with this time dependency.

There can be several restrictions on the selection of the blinking codes. The first one is that the sequence should consist of an equal amount of 0's and 1's, in order for the adaptive threshold to be exactly between the two intensity states. Furthermore, there should be no ambiguity between the binary sequences when time evolves. And lastly, the Hamming distance between all binary sequences should be as large as possible in order to minimize faulty identifications. The Hamming distance can be defined as the number of positions at which the corresponding symbols of two equal length codes are different. For example, the Hamming distance between [1001101] and [0001111] is two. A Hamming distance of at least two is preferable based on practical experiences. The individual binary codes Ci for each beacon can be stored in a matrix.

One of the problems is that it is very unlikely that the camera system's frame rate and the beacon's blinking rate are exactly matched. This mismatch may result in faulty identifications for certain time instances. These incorrect identifications are caused by the fact that when the image sensor is exactly exposed during the time instant when a beacon switches between the two intensity states, the blob area is somewhere between the high and low intensity state. This behavior is observed to be periodic, since it is a consequence of the fixed mismatch between the blinking rate and the camera's frame rate. Note that, this mismatch can in theory be compensated for by adapting the blinking rate so that the blinking rate or a multitude thereof matches the camera's frame rate. However, in practice there will always be a certain small mismatch caused by mismatching clocks of the different electronic components. Thus this periodic behavior will always occur, where the period of this behavior is governed by the difference between the camera's frame rate and beacon's blinking rate. With an additional step the results of this undesired behavior can be eliminated. By tracking the identities of each blob over a longer period of time, the faulty identification can be excluded by taking the statistical mode of the obtained identity-list, i.e. the statistically most frequently recurring value, since the faulty identifications occur for a relative short amount of time.

Alternative methods of blob identification used in conjunction with the method using blinking sequences as described above, include identification by pixel location and identification by projection. In blob identification by pixel location it is assumed that the shift in pixels of a blob's centroid is small between two consecutive frames, which is valid when the camera's frame rate is sufficiently high or when the movement of the camera is slow. With this assumption, identity information of the blobs in the previous frame can be used in step 509 of FIG. 5 to determine, i.e. predict the identities of the blobs in the current frame. Under the assumption that the change in pose between two consecutive frames is small, a projection of the beacon's position in the world into the image using the previous pose can be used to identify the blobs. This projection of world points into the 2D image object follows the perspective projection model for calibrated cameras.

The methods above describe the identification process for one blob. However, in practice multiple blobs are in the image and therefore some additional steps need to be taken. To this effect one has to know the correspondences between blobs in two different image frames, also when the number and locations of detected blobs change. This is done by comparing the locations of a blob in one image to the blobs in the other image, with the assumption that a blob location does not shift much between two consecutive images.

An alternative method for tracking and predicting locations and thereby identities of image objects corresponding to beacons may be based on capturing a reference image, assigning a reference positions of at least one predetermined object in said reference image, each reference position corresponding to a beacon, correlating a subsequent image of the sequence of captured images with said reference image, determining positions of each object in said subsequent image corresponding to a beacon using said correlation. The reference image can be periodically refreshed.

Another alternative method for tracking and predicting locations and thereby identities of image objects corresponding to beacons may be based on pre-matching an image object with a beacon in a first image in a subsequent image using the prediction, performing one of identifying an image object in said subsequent image using the pre-matching if said image object is not identified in the subsequent image and deleting the image object in said subsequent image if said object is not identified in said first image. The pre-matching can be performed using a coordinate transformation of the known beacon coordinates to image object locations as perceived by the camera system.

In step 506, the images 503 from the camera system 203 may be corrected for distortion. The lens of the camera system 203 may for example introduce a high level of distortion, but this can be corrected using a camera model. Camera calibration is the process of computing the extrinsic and intrinsic parameters of a camera. Fisheye lens cameras, which fall in the class of omnidirectional cameras, are widely used in many robotic systems, since their wide viewing angle makes them very practical in many applications. However, the lenses of fisheye cameras achieve this extremely wide angle by distorting the lines of perspective. Because of the extreme distortion that a fisheye lens produces, a standard camera model is not applicable. In the art camera model are available which are able to map the distortion of most fisheye cameras to an undistorted camera image.

Once the image objects, i.e. blobs, have been matched to beacons, in step 507 the PnP-algorithm is solved. Each image object 401a-401i is assigned to an image point having coordinates in the coordinate system of the body fixed frame 103. Given a number of at least 3 3D reference points in the world fixed frame 104 and their corresponding 2D image points of the body fixed frame, the problem of determining the orientation and position of a fully calibrated perspective camera is known as the perspective-n-point PnP problem. It has many applications in computer vision, robotics and augmented reality and has received much attention amongst their research fields. Despite being a topic studied for more than a century (the first solutions dates back to 1841) the last decade has witnessed a wide body of literature in which the primary goal has been to build efficient and accurate solutions scalable to a large number of points.

Many different algorithms can be found in the art that solve the PnP-problem. The PnP-solver can be formulated as a quaternion-based minimization problem and its solution can be calculated using the Gröbner basic technique. This is described as optimal PnP resolution (OPnP) in ref [1]. OPnP is capable of retrieving all solutions, when multiple solutions indeed exist. Experimental results have demonstrated that the OPnP algorithm of ref [1] is preferred, and leads to acceptable determination of position and orientation, i.e. pose 508. As PnP and OPnP techniques are beyond the scope of this application, these techniques will not be detailed in this description.

The step of identity prediction 509 in a current image uses the pose 508 and matched image object or blob identifications from a previous image, which is provided in step 510.

The pose estimation can alternatively be based on stereoscopic vision, wherein the spatially movable platform is provided with at least two image capturing devices, i.e. camera's, each of which generates a corresponding sequence of two dimensional images. Using the identification of beacons in these sequences on the basis of intensity variation, a three-dimensional map of the environment with these beacons can be generated from these sequences of two-dimensional images. The pose estimation is subsequently based on this three-dimensional map, wherein position and attitude of the spatially movable platform is determined using locations of the identified beacons in the three dimensional map.

Another alternative way of pose estimation can be achieved using a sequence of two-dimensional images of an imaging device, i.e. camera on the spatially movable platform, wherein beacons in the environment are identified using the intensity variation as described above, and wherein additional distance information of the beacons is used in combination with resection to create a three-dimensional map for pose estimation of the spatially movable platform. The additional distance information can be obtained using sensors such as for example ultrasonic sensor to measure a distance between the beacons and the spatially movable platform.

The embodiments described in this detailed description are given by way of example only. Alternatives and variations may be feasible without departing from the scope of this application as defined by the claims set out below. Features preceded by articles such as 'a' and 'an' in this application are to be construed as not being limited to a single feature, but may refer to one or more of such features. The word comprising in this application is to be construed as not excluding other features.

The invention claimed is:

1. A method of estimating a pose of a spatially movable platform, comprising:
   providing at least one beacon comprising an optical transmitter;
   each beacon transmitting an optical radiation signal using said optical transmitter, each beacon transmitting a mutually different fixed length blinking pattern comprising zero and non-zero light intensities by modulating an intensity of said optical radiation signal,
   providing a spatially movable platform;
   providing a pose estimation system comprising an image capturing device mounted on said spatially movable platform and image processing means communicatively connected to said image capturing device;
   capturing a sequence of two-dimensional images of said optical radiation signal from said at least one beacon by said image capturing device; and
   processing said sequence of two-dimensional images by said image processing means, characterized in that said processing said sequence of two-dimensional images by said image processing means comprises:
   identifying at least one image object in said sequence of two-dimensional images;
   determining an intensity variation of said at least one image object;
   detecting said fixed length blinking pattern relating to one of said at least one beacon using said intensity variation; and
   matching said image object to a corresponding beacon using said detected fixed length blinking pattern to obtain a at least one matched image object;
   estimating a pose of said spatially movable platform relative to said at least one beacon using said at least one matched image object; wherein said modulating said intensity of said optical radiation signal of said beacon is performed using at least two different non-zero radiation states; and
   wherein said intensity variation of said at least one image object in said sequence of two dimensional images is between at least two different non-zero intensity states.

2. The method according to claim 1, characterized by said at least two different nonzero radiation intensity states comprises a high intensity state and a low intensity state.

3. The method according to claim 1, characterized by said fixed length blinking pattern comprises a code having a plurality of code elements, and wherein each code element has a value.

4. The method according to claim 3, characterized by said plurality of code elements comprises bits, each bit having a true value or a false value.

5. The method according to claim 3, characterized by said code having a fixed number of code elements.

6. The method according to claim 5, characterized by said code comprises a cyclic code.

7. The method according to claim 1, characterized by said detecting a blinking pattern relating to a beacon from said at least one image object further comprising converting each image of said sequence of two-dimensional images into a binary image; and representing said image object as a binary large object (BLOB).

8. The method according to claim 1, characterized by said determining said intensity variation of said image object comprising determining a size of said image object.

9. The method according to claim 1, characterized by said determining said intensity variation of said image object further comprising tracking said image object in said sequence of two-dimensional images.

10. The method according to claim 9, characterized by said tracking comprising any one of the group comprising:
   pixel distance matching between corresponding image object in consecutive images of said sequence of captured images;
   determining a spatial displacement of said spatially movable platform using displacement determining means; and predicting a displacement of image object in consecutive images of said sequence of captured images;
   determining an optical flow between consecutive images of said sequence of captured images and predicting a corresponding displacement of corresponding objects in consecutive images of said sequence of captured images using said optical flow;
   determining a direct correlation between a selection of image objects in consecutive images of said sequence of captured images; and predicting a corresponding displacement of other image objects in consecutive images of said sequence of captured images using said direct correlation.

11. The method according to claim 1, characterized by performing said determining an intensity variation of an image object in said sequence of two-dimensional images, and detecting said blinking pattern relating to said beacon from said image object using said intensity variation and matching said image object to said beacon using said detected blinking pattern to obtain a matched image object and matched image point every m-th subsequent image of said sequence of captured images, wherein m is an integer value greater than 1.

12. The method according to claim 1, characterized by said pose estimation is performed by a method of the group comprising:
   a perspective-n-point (PnP) method;
   capturing at least one further sequence of two-dimensional images of said optical radiation signal from said at least one beacon by at least one further image capturing device; and wherein said processing said sequence of two-dimensional images by said image processing means comprises processing said at least one further sequence of two dimensional images to create a three-dimensional map of the beacons, and wherein said estimating a pose is based on said three-dimensional map;
   measuring at least one distance from said spatially movable platform to each of said at least one beacon, and wherein said processing said sequence of two-dimensional images by said image processing means comprises creating a three-dimensional map of the beacons using said sequence of two-dimensional images and said at least one distance from said spatially movable platform to each of said at least one beacon, and wherein said estimating said pose is based on said three-dimensional map.

13. A beacon for use in the method for estimating of a pose of a spatially movable platform according to claim 1, comprising an optical transmitter for transmitting an optical radiation signal; and a modulator configured and arranged for modulating said optical transmitter in accordance with an blinking pattern relating to said beacon, said blinking pattern comprising a plurality of code elements, wherein said modulator is further configured and arranged for intermittently transmitting said optical radiation signal using at least two different radiation intensity states corresponding to respective code element values of said blinking pattern, characterized by said at least two different radiation intensity states corresponding to said respective code element values of said blinking pattern comprise at least two different non-zero radiation states.

14. A pose estimation system for use in the method for estimating of a pose of a spatially movable platform according to claim 1, the pose estimation system comprising an image capturing device and image processing means, wherein said image processing means are communicatively connected to said image capturing device; and wherein said image capturing device is configured and arranged for capturing a sequence of two-dimensional images of said optical radiation signal from at least one beacon, characterized in that said image processing means are configured and arranged for processing said sequence of two-dimensional images, comprising:
   identifying at least one image object in said sequence of two-dimensional images; determining an intensity variation of said at least one image object;
   detecting said blinking pattern relating to one of said at least one beacon using said intensity variation; and matching said image object to a corresponding beacon using said detected blinking pattern to obtain at least one matched image object; and estimating a pose of said spatially movable platform relative to said at least one beacon using said at least one matched image object, wherein said intensity variation of said at least one image object in said sequence of two dimensional images is between at least two different non-zero intensity states.

15. The method of estimating a pose of a spatially movable platform of claim 3, wherein a hamming code distance between subsequent codes is at least two.

16. The method of estimating a pose of a spatially movable platform of claim 1, where the non-zero light intensities comprise both a high intensity state and a low intensity state.

* * * * *